United States Patent
Cattoen et al.

(10) Patent No.: US 10,216,604 B2
(45) Date of Patent: Feb. 26, 2019

(54) MONITORING ENVIRONMENTAL PARAMETERS ASSOCIATED WITH COMPUTER EQUIPMENT

(71) Applicant: CA, INC., New York, NY (US)

(72) Inventors: Francois Cattoen, Paris (FR); Janne Koponen, Datchet (GB); Dhesikan Ananchaperumal, Framingham, MA (US)

(73) Assignee: CA, INC., New York, NY (US)

( * ) Notice: Subject to any disclaimer, the term of this patent is extended or adjusted under 35 U.S.C. 154(b) by 711 days.

(21) Appl. No.: 14/670,908

(22) Filed: Mar. 27, 2015

(65) Prior Publication Data

US 2016/0283343 A1    Sep. 29, 2016

(51) Int. Cl.
*G06F 11/32* (2006.01)
*G06F 11/30* (2006.01)

(52) U.S. Cl.
CPC ...... *G06F 11/3058* (2013.01); *G06F 11/3062* (2013.01); *G06F 11/3065* (2013.01); *G06F 11/32* (2013.01)

(58) Field of Classification Search
None
See application file for complete search history.

(56) References Cited

U.S. PATENT DOCUMENTS

| | | | | |
|---|---|---|---|---|
| 5,566,069 A | * | 10/1996 | Clark, Jr. | G06F 3/033 702/2 |
| 5,710,047 A | * | 1/1998 | Murray | A01G 25/16 436/174 |
| 6,161,075 A | * | 12/2000 | Cohen | G06F 17/10 702/3 |
| 6,553,336 B1 | * | 4/2003 | Johnson | G01D 3/022 702/108 |
| 6,722,185 B2 | * | 4/2004 | Lawson | G01M 3/042 340/539.17 |
| 6,853,958 B1 | * | 2/2005 | Turin | H04L 12/66 702/182 |
| 7,142,123 B1 | * | 11/2006 | Kates | G01N 27/048 340/602 |
| 7,171,312 B2 | * | 1/2007 | Steinthal | B82Y 30/00 422/82.02 |
| 7,218,237 B2 | * | 5/2007 | Kates | G08B 19/00 137/312 |
| 7,231,298 B2 | * | 6/2007 | Hnilica-Maxwell | A01G 1/00 702/3 |
| 7,269,527 B1 | * | 9/2007 | Frank | G01T 7/00 340/286.01 |
| 7,386,289 B2 | * | 6/2008 | Weller | G08C 17/02 340/870.07 |

(Continued)

*Primary Examiner* — Michael Lebentritt
(74) *Attorney, Agent, or Firm* — Fabian VanCott; Steven L. Nichols

(57) ABSTRACT

A method for monitoring environmental parameters associated with computer equipment is described. According to the method a number of environmental parameters related to a number of computing devices are measured using a number of sensors associated with, and located at, a number of computing devices. The sensed environmental parameters are displayed, with a computer, based on an actual view of the number of computing devices. The displayed sensed environmental parameters create a spatial relation with a space to which each sensed environmental parameter pertains.

21 Claims, 7 Drawing Sheets

(56) References Cited

U.S. PATENT DOCUMENTS

| | | | | |
|---|---|---|---|---|
| 7,493,193 | B2* | 2/2009 | Hyland | G06F 11/3058 700/275 |
| 7,561,057 | B2* | 7/2009 | Kates | G01M 3/002 340/605 |
| 7,619,346 | B2* | 11/2009 | Yazdi | G01K 1/024 310/307 |
| 7,768,408 | B2* | 8/2010 | Reggiardo | A61B 5/0002 340/573.1 |
| 7,920,907 | B2* | 4/2011 | McGarraugh | A61B 5/14532 600/347 |
| 8,147,302 | B2* | 4/2012 | Desrochers | F24F 3/044 340/632 |
| 8,330,605 | B2* | 12/2012 | Johnson, Jr. | H04W 4/043 340/3.1 |
| 8,333,876 | B2* | 12/2012 | Chou | G01N 27/4165 204/415 |
| 9,015,071 | B2* | 4/2015 | Breed | G06Q 10/06 705/28 |
| 9,023,657 | B2* | 5/2015 | Kathe | G01N 33/1846 436/180 |
| 9,107,354 | B2* | 8/2015 | Martin | A01G 25/167 |
| 9,121,837 | B2* | 9/2015 | Chan | G01D 21/02 |
| 9,612,195 | B1* | 4/2017 | Friedman | G01N 21/3504 |
| 2011/0203347 | A1* | 8/2011 | Hower | G01D 21/00 73/12.01 |
| 2011/0235041 | A1* | 9/2011 | Rao | G08B 21/12 356/437 |
| 2012/0056847 | A1* | 3/2012 | Milford | G06F 1/3231 345/174 |
| 2013/0247183 | A1* | 9/2013 | Kumar | G06F 21/554 726/22 |
| 2013/0278427 | A1* | 10/2013 | Setton | G08B 21/12 340/584 |
| 2013/0289927 | A1* | 10/2013 | Smith | G06F 17/18 702/130 |
| 2014/0002486 | A1* | 1/2014 | Ratcliff | G09G 3/003 345/629 |
| 2015/0330817 | A1* | 11/2015 | Law | G01D 21/02 702/3 |
| 2016/0007426 | A1* | 1/2016 | Ashdown | H05B 37/0227 700/90 |
| 2016/0091877 | A1* | 3/2016 | Fullam | G05B 15/02 700/276 |
| 2017/0102249 | A1* | 4/2017 | Yazdi | G01D 5/12 |

* cited by examiner

MONITORING ENVIRONMENTAL PARAMETERS ASSOCIATED WITH COMPUTER EQUIPMENT

BACKGROUND

A number of computing devices may be co-located in a room to allow for the common usage of electricity, network infrastructure, physical security, and environmental control systems. The computing devices operate in a temperature range to allow for the proper function of the computing devices. Environmental monitoring devices, such as a thermostat, adjust the environmental parameters in the room. A technician may enter a room to observe the environmental conditions in the room.

BRIEF SUMMARY

According to one aspect of the present disclosure, a method is implemented by an environmental parameters monitoring system. The environmental parameters monitoring system includes measuring, using a number of sensors associated with and, located at, a number of computing devices, a number of environmental parameters related to the number of computing devices. The environmental parameters monitoring system includes, with a computer, displaying sensed environmental parameters, based on an actual view of the number of computing devices, to create a spatial relation between a display of the sensed environmental parameters and a space to which each sensed environmental parameter pertains.

According to one aspect of the present disclosure, a computer monitoring system that monitors environmental parameters of computing devices. The system includes a processor, with memory communicatively connected to the processor, a computer display device, communicatively connected to the processor, and an environmental parameters monitoring system to use the processor to execute modules. The environmental parameters monitoring system includes a measuring module. The measuring module measures, using a number of sensors associated with and, located at, a number of computing devices, a number of environmental parameters related to the number of computing devices. The environmental parameters monitoring system includes a receiving module. The receiving module receives a set of supplemental environmental parameters, the supplemental environmental parameters representing environmental parameters to supplement the sensed environmental parameters. The environmental parameters monitoring system includes an adjusting module. The adjusting module adjusts the sensed environmental parameters based on the set of supplemental environmental parameters. The environmental parameters monitoring system includes a displaying module. The displaying module displays sensed environmental parameters to create a spatial relation between a display of the sensed environmental parameters and a space to which each sensed environmental parameter pertains. The environmental parameters monitoring system includes a presenting module. The presenting module presents a message when a sensed environmental parameter measures based on a policy range.

According to one aspect of the present disclosure, a system for monitoring environmental parameters for a computing device, which includes a non-transitory computer readable storage medium, the computer readable storage medium having computer readable program code embodied therewith. The computer readable program code, when executed by the processor, causes the processor to measure, using a number of sensors associated with and, located at, a number of computing devices, a number of environmental parameters related to the number of computing devices. The computer readable program code, when executed by the processor, causes the processor to receive a set of supplemental environmental parameters, the supplemental environmental parameters representing environmental parameters to supplement the sensed environmental parameters. The computer readable program code, when executed by the processor, causes the processor to adjust the sensed environmental parameters based on the set of supplemental environmental parameters. The computer readable program code, when executed by the processor, causes the processor to display sensed environmental parameters to create a spatial relation between a display of the sensed environmental parameters and a space to which each sensed environmental parameter pertains.

BRIEF DESCRIPTION OF THE DRAWINGS

Aspects of the present disclosure are illustrated by way of example and are not limited by the accompanying figures, with like references indicating like elements.

Throughout the drawings, identical reference numbers designate similar, but not necessarily identical, elements.

DETAILED DESCRIPTION

Figure 1:
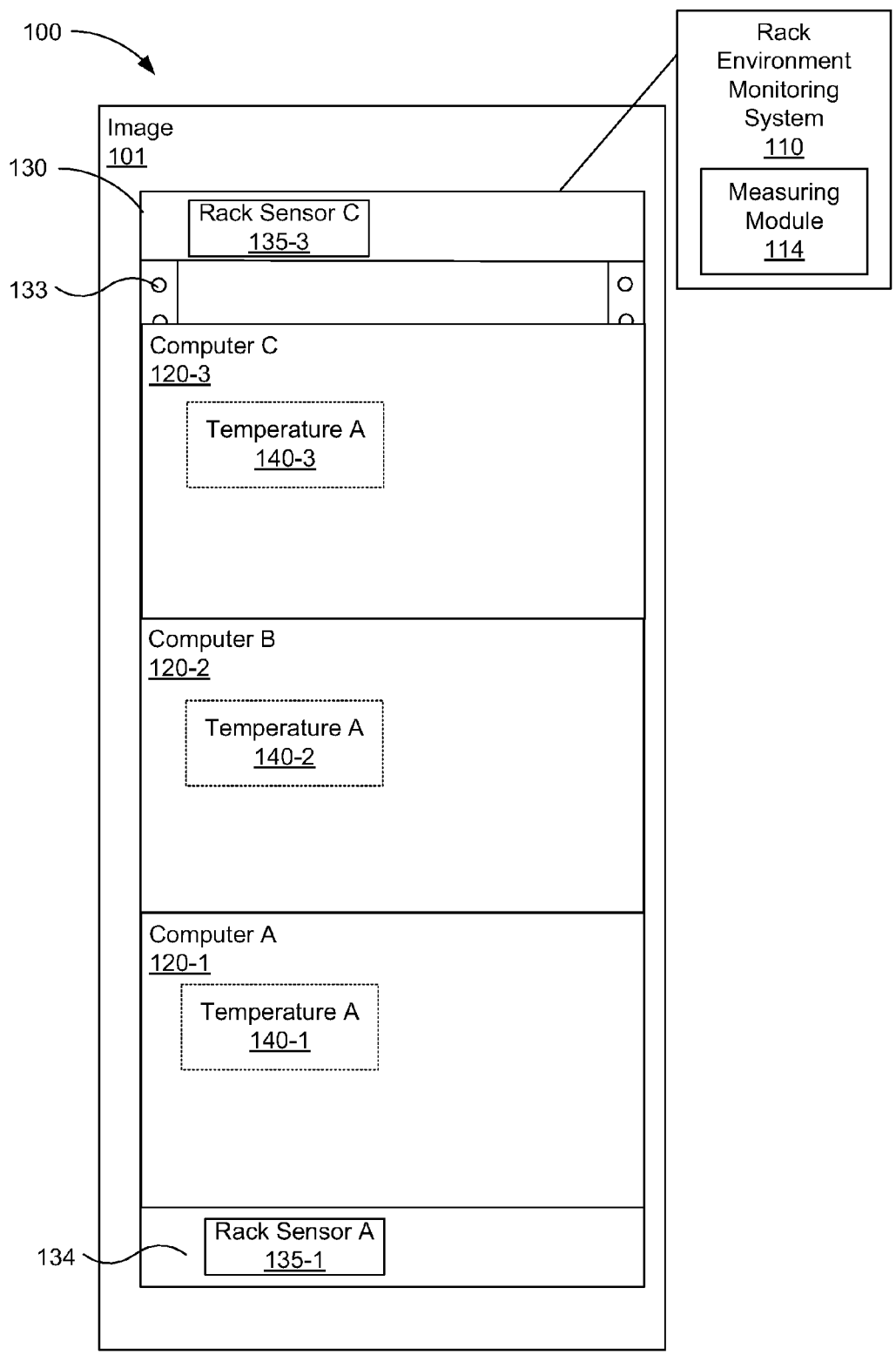
FIG. 1 illustrates a computing equipment monitoring system, according to one example of the principles described herein.

The present specification describes a method and system for monitoring environmental parameters of computing equipment, such that a user of the system observes the environmental parameters spatially related to the equipment.

The subject matter described herein may be a system, a method, and/or a computer program product. The computer program product may include a computer readable storage medium (or media) having computer readable program instructions thereon for causing a processor to carry out aspects of the subject matter described herein.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented as entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but is not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but is not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment, or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, can direct a computer, other programmable data processing apparatus, or other devices to function in a particular manner, such that the instructions, when stored in the computer readable medium, produce an article of manufacture including instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Computing devices are co-located to provide ease in device management. A number of computing devices may be placed in an area called a data center. A number of computing devices may be organized in a machine room using a computer rack. A computer rack holds a number of computing devices. A number of racks may be used in a data center. The environment, monitored through environmental parameters in a data center, allows the computing devices to function. A technician may monitor a number of sensors on an administrative computing system outside of the data center to observe environmental parameters in the data center. A technician that observes an environmental issue on the administrative computing system remembers the environmental issue and the location in the data center and proceeds to the data center to gather additional information about the computing devices in the area.

The technician may not remember all data associated with the environmental parameters. The technician may not observe a correlation between a number of different environmental parameters in one area. The technician may struggle to correlate the environmental parameters displayed on the administrative computing system with the physical environment of the data center. The technician may not recognize that an environmental parameter that is not within an operating range may indicate that a device is malfunctioning. As a result, the technician may not address an issue that is manifest in the environmental parameters. Further, the environmental parameters may be presented in displays separate from the computing devices.

According to the principles described herein, a system measures environmental parameters using sensors associated with the computing device. The system for monitoring environmental factors displays the environmental parameters to create a spatial relation between the display of the environmental parameters and the space to which each environmental parameter pertains. The system may be used on a mobile device to allow a technician to walk through a data center and observe environmental parameters related to a computing device while observing the computing device. The system may allow a technician to observe a deviation in environmental parameters as a potential problem. The system allows a technician to observe a computing device and the environmental parameters, as well as to experience the environment. Environmental parameters associated with a computing device may be displayed over an image or view of a computing device to facilitate the association of the environmental parameters and the computing device.

As used in the present specification and in the appended claims, the term "a number of" or similar language may include any positive number, including one to infinity; zero not being a number, but the absence of a number.

As used in the present specification and in the appended claims, the term "computing device" refers to an electronic machine for performing automatic calculations. A computing device includes peripherals, such as a disk drive, associated with a central processing unit.

As used in the present specification and in the appended claims, the term "computer rack" refers to a device used to organize a number of computer devices. A computer rack allows a number of computing devices to be vertically stacked to preserve floor space and to organize the computing devices.

As used in the present specification and in the appended claims, the term "computing equipment" refers to equipment that is used in the operation of a computing device. Computing equipment includes equipment not communicatively connected to a computing device, such as a ventilation system.

As used in the present specification and in the appended claims, the term "sensor" refers to a device that detects or measures a physical property and records, indicates, or otherwise responds to the physical property. A sensor may be communicatively connected to a computer network to communicate with a computing device.

As used in the present specification and in the appended claims, the term "environmental parameters" refers to a measurable factor, forming one of a set, that defines conditions relating to the natural world. An environmental parameter provides information related to conditions surrounding a computing device.

As used in the present specification and in the appended claims, the term "supplemental environmental parameters" refers to additional data relating to a number of environmental parameters. Supplemental environmental parameters allow a computing system to adjust to information in the environment that is not detected by sensors measuring environmental parameters.

As used in the present specification and in the appended claims, the term "electricity usage" refers to the form of consumption of energy resulting from the existence of charged particles, either statically existing or dynamically present in an electrical current. Electricity consumption is measured by the number of watts of energy consumed over a period of time.

As used in the present specification and in the appended claims, the term "policy" refers to a set of rules or principles adopted by a computing device to define expected conditions. A policy informs the system as to parameters and limits to where data is expected to reside.

Referring now to the figures, FIG. 1 illustrates an example of a computing equipment monitoring system (100), according to one example of the principles described herein. The computer equipment monitor system (100) includes a rack environment monitoring system (110). The rack environment monitoring system (110) communicates with a number of sensors (135) communicatively connected to the rack environment monitoring system (110). The sensors (135) are associated with a computer rack (130), which is associated with an image (101). The rack environment monitoring system (110) includes a measuring module (114) to measure a number of environmental parameters. The rack environment monitoring system (110) shows the number of environmental parameters related to a number of computing devices (120).

As illustrated in FIG. 1, the system (100) includes a rack environment monitoring system (110). The rack environment monitoring system (110) measures a number of environmental parameters (140) using a number of sensors (135) communicatively connected to the rack environment monitoring system (110). The computing devices (120) may include a number of additional sensors, communicatively connected to the rack environment monitoring system (110). The rack environment monitoring system (110) displays the environmental parameters to create a spatial relation between a display of the sensed environmental parameters and a space to which each sensed environmental parameter pertains. The computer rack (130) supports a number of computing devices (120). The number of computing devices (120) may change environmental parameters that are measured by the number of rack sensors (135). As will be described below, the rack environment monitoring system measures environmental parameters using the rack sensors (135).

The display of the sensed environmental parameters is displayed in an image (101) to create a spatial relation between the sensed environmental parameters and the space to which each sensed environmental parameter pertains. The image (101) of the computer rack (130) shows a number of features of the computer rack (130). The computer rack (130) includes a cross member (134) to maintain the width of the computer rack (130) and to add rigidity to the computer rack (130). The cross member (134) may include a number of rack sensors (135) measuring a number of environmental parameters. A rack sensor (135) measures physical properties of environmental parameters associated with the computer rack (130).

The computer rack includes a number of mounting fixtures (133). The number of mounting fixtures (133) are used to mount a number of computing devices (120). The mounting fixtures (133) may allow a number of different computing devices (120) to be supported in the computer rack (130). The computing devices (120) alter environmental parameters in the area of the computer rack (130). The computing devices (120) may consume electricity, produce heat, or alter air flow.

The rack environment monitoring system (110) displays a number of sensed environmental parameters. The environmental parameters may be displayed in an image (101) to create a spatial relation between the sensed environmental parameters and the space to which the environmental parameters pertain. The display of the sensed environmental parameters provides a viewer of an image (101) with a visual observation of non-visual information.

As illustrated in FIG. 1, the system (100) includes a rack environment monitoring system (110). The rack monitoring system (110) monitors a number of environmental parameters associated with a computer rack (130). The environmental factors in the area of the computer rack (130) may be altered by activity in or around the computer rack (130). For example, a number of computers (120) in the computer rack (130) may generate heat. An air cooling system may be placed near the computer rack to reduce the heat in the area of the computers. As dust accumulates in the fan and heat sinks in a computing device, the fan and heat sinks lose efficiency. The change in efficiency of the fan and heat sink alter the environmental parameters surrounding the computing rack. A technician that observes changes in non-visual environmental parameters may be able to detect changes in the environmental parameters that indicate an imminent equipment failure.

The rack environment monitoring system (110) measures, using a number of sensors (135) associated with a number of computing devices (120), a number of environmental parameters related to the number of computing devices. A sensor (135) may measure a number of environmental parameters. The rack environment monitoring system (110) may extrapolate data collected from sensors to determine environmental parameters around the sensor.

The rack environment monitoring system (110) with a computer, displaying sensed environmental parameters, based on an actual view of the number of computing devices, to create a spatial relation between a display of the sensed environmental parameters and a space to which each sensed environmental parameter pertains. The rack environment monitoring system (110) displays environmental parameters in an image (101) of the number of computing devices (120). The temperature (140) of a computing device (120) is shown in the image (101) of the computer rack (130). Temperature A (140-1) is shown on computer A (120-1). Temperature B (140-2) is shown on computer B (120-2). Temperature C (140-3) is shown on computer C (120-3).

Figure 2A:
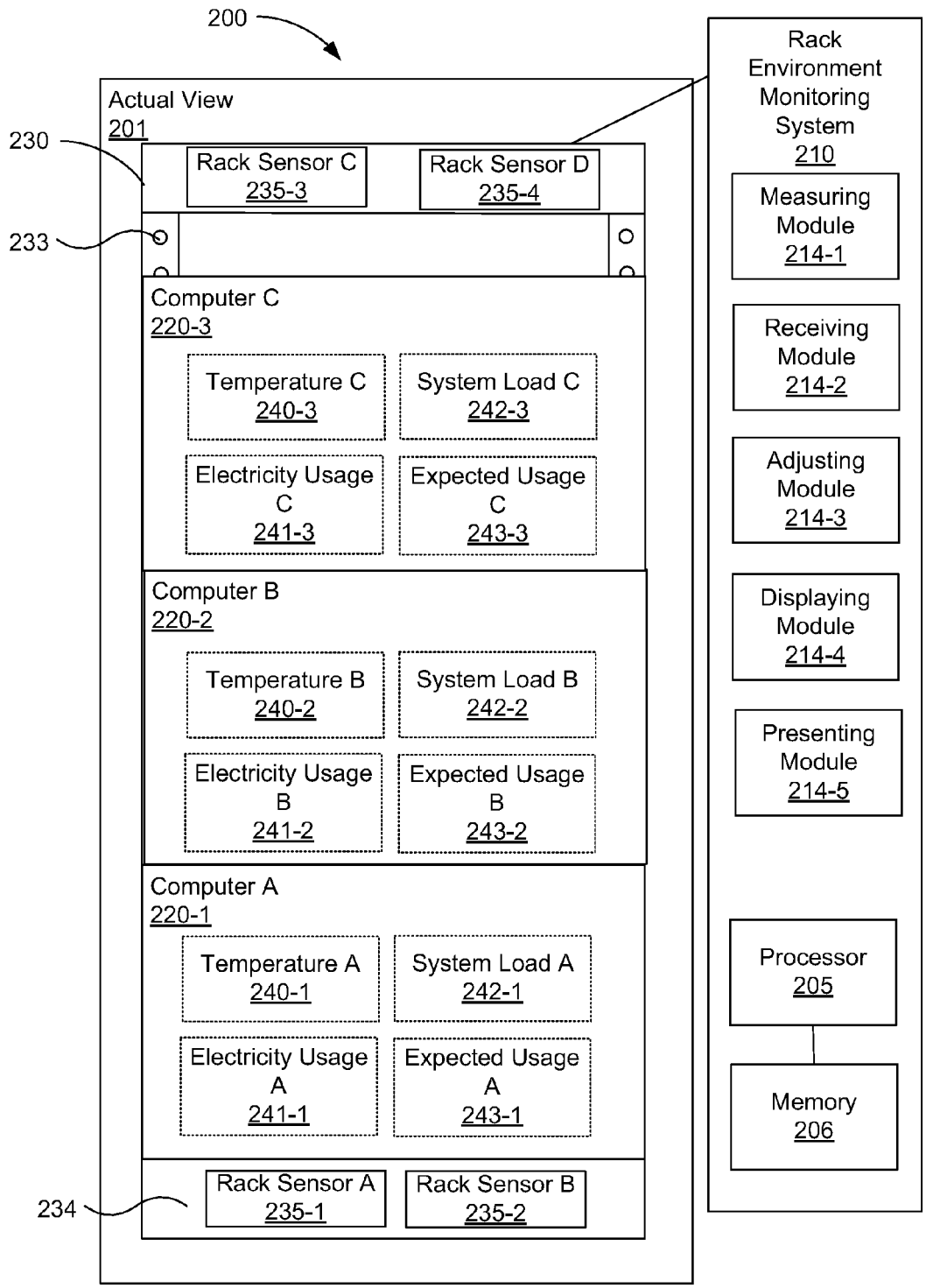
FIG. 2A illustrates a computing equipment monitoring system, according to one example of the principles described herein.

FIG. 2A illustrates an example of a computing equipment monitoring system (200), according to one example of the principles described herein. The computer equipment monitor system (200) includes a rack environment monitoring system (210). The rack environment monitoring system (210) communicates with a number of sensors (235) communicatively connected to the rack environment monitoring system (210). The sensors (235) are associated with a computer rack (230), which is associated with an actual view (201) of a number of computing devices. The rack environment monitoring system (210) includes a measuring module (214-1), to measure a number of environmental parameters. The rack environment monitoring system shows the number of environmental parameters in the actual view (201) of the number of computing devices.

As illustrated in FIG. 2A, the system (200) includes a rack environment monitoring system (210). The rack environment monitoring system (210) may be a computing system that processes environmental parameters associated with an actual view (201) of a number of computing devices. The rack environment monitoring system (210) measures, using a number of sensors (235) associated with a number of computing devices (220), a number of environmental parameters related to the number of computing devices (220). The rack environment monitoring system (210) adjusts the sensed environmental parameters based on the set of supplemental environmental parameters. The rack environment monitoring system (210) receives a set of supplemental environmental parameters, the supplemental environmental parameters representing environmental parameters to supplement the sensed environmental parameters. The rack environment monitoring system (210), with a computer, displays sensed environmental parameters to create a spatial relation between a display of the sensed environmental parameters and a space to which each environmental parameter pertains.

The rack environment monitoring system (210) includes a processor (205), communicatively connected to memory (206). The rack environment monitoring system (210) includes a number of modules (214). The modules (214) refer to computer program code which, when executed by the processor (205), performs the designated function. As illustrated, the rack environment monitoring system (210) includes a measuring module (214-1), a receiving module (214-2), an adjusting module (214-3), a displaying module (214-4) and a presenting module (214-5).

The rack environment monitoring system (210) includes a measuring module (214-1). The measuring module (214-1) measures, using a number of sensors (235) associated with a number of computing devices (220), a number of environmental parameters related to the number of computing devices (220). A computing device (220) may contain a number of sensors related to the operation of the computing device (220). The environmental parameters include measurable factors, each forming one of a set that defines conditions relating to the natural world. An environmental parameter provides information related to conditions surrounding a computing device (220). An environmental parameter may be selected from the set temperature, electricity usage, air flow, system load, or other parameters that may affect a computing device. The measuring module (214-1) compiles a number of different parameters and extrapolates the value of a parameter and different points in an actual view (201) of the computing devices (220). A sensor (235) may measure the production of environmental parameters. In one example, a sensor (235) may monitor the amount of heat a system produces. In another example, a sensor (235) may monitor the output of a cooling device, such as an air conditioner.

The rack environment monitoring system (210) includes a receiving module (214-2). The receiving module (214-2) receives a set of supplemental environmental parameters, the supplemental environmental parameters representing environmental parameters to supplement the sensed environmental parameters. A computing device (220) in a computer rack (230) may not include sensors (235) for all environmental parameters. Additionally, a sensor may be known to malfunction and provide no data or inaccurate data. The supplemental environmental parameters allow the rack environment monitoring system (210) to compensate for inaccurate or incomplete environmental parameters reported by the sensors (235). The supplemental environmental parameters may be used to provide information about expected production of energy, such as heat or air movement. For example, a supplemental environmental parameter may estimate an amount of heat being produced by a computing device (220). In another example, a supplemental environmental parameter may estimate the cooling capacity of an air conditioning unit.

The rack environment monitoring system (210) includes an adjusting module (214-3). The adjusting module (214-3) adjusts the sensed environmental parameters based on the set of supplemental environmental parameters. The adjusting module (214-3) adjusts data, based on the supplemental environmental parameters, to calculate an accurate view of the environmental parameters.

The rack environment monitoring system (210) includes a displaying module (214-4). The displaying module (214-4) displays sensed environmental parameters to create a spatial relation between a display of the sensed environmental parameters and a space to which each sensed environmental parameter pertains. The displaying module (214-4) may display the sensed environmental parameters in an image of a number of computing devices. The displaying module (214-4) may display the environmental parameters by displaying the environmental parameters over a natural view of the number of computing devices. The environmental parameters displayed over a natural view may be projected on a lens, such that an observer sees the environmental parameters over the number of computing devices. The displaying module may display a deviation between an expected environmental parameter and a measured environmental parameter.

The rack environment monitoring system (210) includes a presenting module (214-5). The presenting module (214-5) presents a message when the environmental parameters measure outside of a policy range. The rack environment monitoring system (210) displays a message that an environmental parameter violates a policy, warning a user that the environmental parameters indicate a problem. For example, a device that measures above the expected temperature range may have a warning that displays "hot" or presents the environmental data in a red character set. The user is alerted to the environmental parameters violating the policy range. In another example, a computing device (220) may be noted as being outside of the expected environmental parameter rage.

FIG. 2A will now be described. The rack environment monitoring system (210) measures a number of environmental parameters using the measuring modules (214-1). The measuring module (214-1) communicates with sensor A (235-1), sensor B (235-2), sensor C (235-3), and sensor D (235-4). The measuring module (214-1) measures the temperature (240) and electricity usage (241) in the computer rack (230). The measuring module (214-1) interacts with a number of computers (220) in the computer rack (230) to measure the system load (242) of each computer (220).

The receiving module (214-2) receives a set of supplemental environmental parameters, the supplemental environmental parameters representing environmental parameters to supplement the sensed environmental parameters. In this example, computer B (220-2) does not report electricity usage. The supplemental environmental parameters specify an estimated amount of electricity usage by computer B (220-2). The supplemental environmental data provides an estimated value to allow the rack environment monitoring system (210) to provide the appearance of having collected all data.

The adjusting module (214-3) adjusts the sensed environmental parameters based on the set of supplemental environmental parameters. The adjusting module (214-3) adjusts the environmental parameters, using the set of environmental parameters to show the estimated electricity usage by computer B (220-2). The adjusting module adjusts the expected heat to be produced by computer B (220-2).

The displaying module (214-4) displays, with a computer, sensed environmental parameters to create a spatial relation between a display of the sensed environmental parameters and a space to which each sensed environmental parameter pertains. As illustrated, the actual view (201) is a view through glasses enabled with a computing device. The displaying module (214-4) displays the environmental parameters in the actual view (201) of the computer rack (230) as seen through the glasses enabled with a computing device. The actual view of the number of computing devices (220) may be an actual view through an optical device worn by a user. The displaying module (214-4) may display the sensed environmental parameters with the optical device worn by the user, the environmental parameters being displayed on the optical device at locations in the actual view seen through the optical device corresponding to each of those environmental parameters. The displaying module (214-4) may calculate where the sensed environmental parameters are displayed based on the view of the user and the location of the computing devices (220) to provide a user wearing the glasses a perceived view of the environmental parameters with a special relation to the space to which the sensed environmental parameter pertains. The displaying module (214-1) displays temperature A (240-1) over computer A (220-1) indicating the temperature of computer A (220-1). The displaying module (214-1) displays temperature B (240-2) over computer B (220-2), indicating the temperature of computer B (220-2). The displaying module (214-1) displays temperature C (240-3) over computer C (220-3), indicating the temperature of computer C (220-3). The displaying module (214-1) displays electricity usage A (241-1) over computer A (220-1), indicating the electricity usage of computer A (220-1). The displaying module (214-1) displays electricity usage B (241-2) over computer B (220-2), indicating the electricity usage of computer B (220-2). The displaying module (214-1) displays electricity usage C (241-3) over computer C (220-3), indicating the electricity usage of computer C (220-3). The displaying module (214-1) displays system load A (242-1) over computer A (220-1), indicating the system load of computer A (220-1). The displaying module (214-1) displays system load B (242-2) over computer B (220-2), indicating the system load of computer B (220-2). The displaying module (214-1) displays system load C (242-3) over computer C (220-3), indicating the system load of computer C (220-3).

The presenting module (214-5) presents a message when the environmental parameters measure outside of a policy range. The presenting module (214-5) presents the expected usage (243), indicating the expected electricity usage of the computer (220). Expected usage A (243-1) indicates the expected electricity usage of computer A (220-1). Expected usage B (243-2) indicates the expected electricity usage of computer B (220-2). Expected usage C (243-3) indicates the expected electricity usage of computer C (220-3).

Figure 2B:
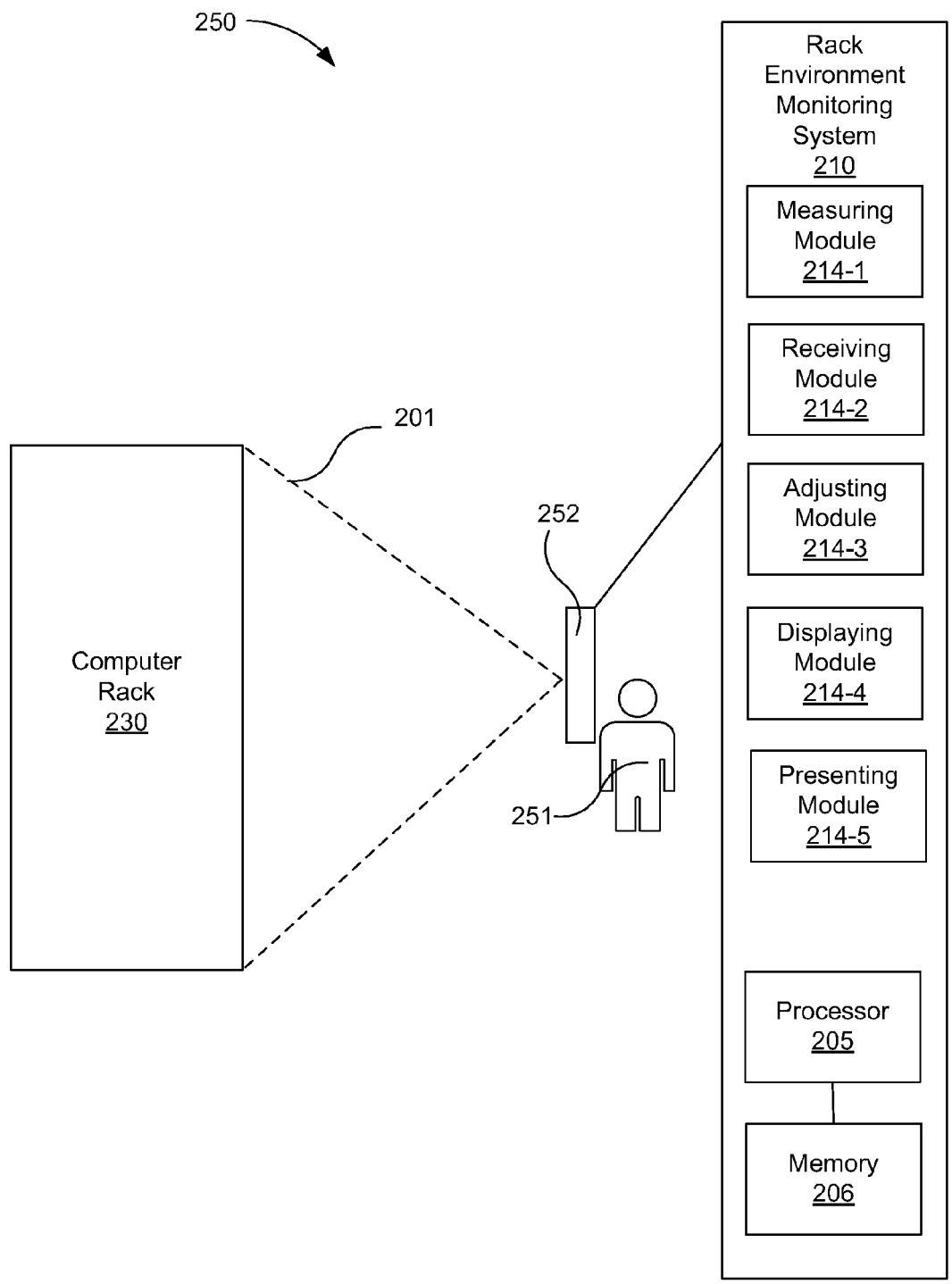
FIG. 2B illustrates a computing equipment monitoring system, according to one example of the principles described herein.

FIG. 2B illustrates an example of a system for monitoring a computing device. An actual view (201) is observed through a wearable device (252) in communication with the rack environment monitoring system (210). The wearable device (252) may take the form of glasses, binoculars, or other devices that a user (251) may look through to observe a computer rack (230).

To achieve the actual view (201) of the computer rack (230) a wearable device (252) may include a camera to digitize, for a computer, the actual view (201) seen by a user (251). The wearable device (252) may use a global positioning system to determine a location of the device. The wearable device (252) may calculate the actual view (201) to determine the display of the sensed environmental parameters. The rack environment monitoring system (210) displays the sensed environmental parameters on the optical device (252) at locations in the actual view (201) seen through the optical device (252) corresponding to each of those environmental parameters. The user (251) may observe the sensed environmental parameters superimposed on the actual view (201). The wearable device (252) may include a system to project the sensed environmental parameters against the wearable device (252). The wearable device (252) may include a system to display the sensed environmental parameters on the wearable device (252). The wearable device (252) may include a system to stimulate the eyes of a user (251) to cause the user (251) to observe the sensed environmental parameters.

Figure 3:
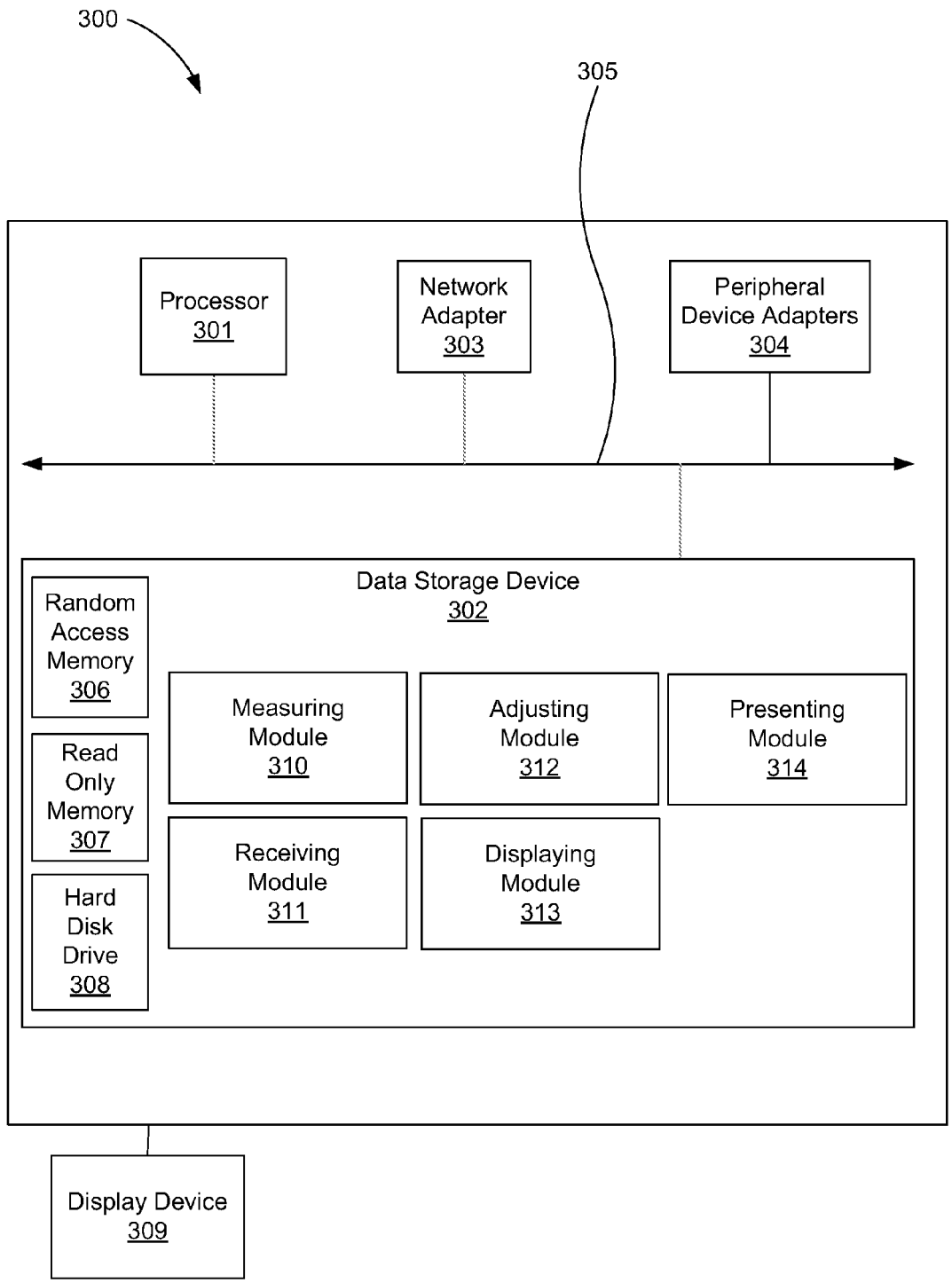
FIG. 3 illustrates a system monitoring computing equipment, according to one example of the principles described herein.

FIG. 3 illustrates an example of a system for monitoring computing equipment, according to the principles described herein. The computing device (300) for monitoring computing equipment may be implemented as an electronic device. Examples of electronic devices include servers, desktop computers, laptop computers, personal digital assistants (PDAs), mobile devices, smartphones, gaming systems, and tablets, among other electronic devices.

To achieve its desired functionality, the computing device (300) may include various hardware components. Among these hardware components may be a number of processors (301), a number of data storage devices (302), a number of peripheral device adapters (304), and a number of network adapters (303). These hardware components may be interconnected through the use of a number of buses and/or network connections. In one example, the processor (301), data storage device (302), peripheral device adapters (304), and network adapter (303) may be communicatively coupled via a bus (305).

The data storage device (302) may store data, such as executable program code, that is executed by the processor (301) or other processing device. As will be discussed, the data storage device (302) may specifically store computer code representing a number of applications that the processor (301) executes to implement at least the functionality described herein.

The data storage device (302) may include various types of memory modules, including volatile and nonvolatile memory. For example, the displaying system (302) of the present example includes Random Access Memory (RAM) (306), Read Only Memory (ROM) (307), and Hard Disk Drive (HDD) memory (308). Many other types of memory may also be utilized, and the present specification contemplates the use of as many varying type(s) of memory in the data storage device (302) as may suit a particular application of the principles described herein. In certain examples, different types of memory in the data storage device (302) may be used for different data storage needs. For example, in certain examples, the processor (301) may boot from Read Only Memory (ROM) (307), maintain nonvolatile storage in the Hard Disk Drive (HDD) memory (308), and execute program code stored in Random Access Memory (RAM) (306).

Generally, the data storage device (302) may comprise a computer readable medium, a computer readable storage medium, or a non-transitory computer readable medium, among others. For example, the data storage device (302) may be, but is not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store computer usable program code for use by, or in connection with, an instruction execution system, apparatus, or device. In another example, a computer readable storage medium may be any non-transitory medium that can contain or store a program for use by, or in connection with, an instruction execution system, apparatus, or device.

The hardware adapters (303, 304) in the computing device (300) enable the processor (301) to interface with various other hardware elements, external and internal to the computing device (300). For example, the peripheral device adapters (304) may provide an interface to input/output devices, such as, for example, a display device (309), a mouse, or a keyboard. The peripheral device adapters (303) may also provide access to other external devices, such as an external storage device, a number of network devices such as, for example, servers, switches, and routers, client devices, other types of computing devices, and combinations thereof.

The display device (309) may be provided to allow a user of the computing device (300) to interact with and implement the functionality of the computing device (300). The peripheral device adapters (304) may also create an interface between the processor (301) and the display device (309), a printer, or other media output devices. The network adapter (303) may provide an interface to other computing devices within, for example, a network, thereby enabling the transmission of data between the computing device (300) and other devices located within the network.

The computing device (300) may, when executed by the processor (301), display the number of graphical user interfaces (GUIs) on the display device (309) associated with the executable program code, representing the number of applications stored on the data storage device (302). The GUIs may include aspects of the executable code, including displaying a number of messages to a user. The GUIs may display the environmental parameters of a number of computer systems in a computer rack. The GUIs may display, for example, a message indicating the environmental parameters of a number of computer systems in a computer rack. Examples of display devices (309) include a computer screen, a laptop screen, a mobile device screen, a personal digital assistant (PDA) screen, and a tablet screen, among other display devices (309). Examples of the GUIs displayed on the display device (309) will be described in more detail below.

The computing device (300) may include a number of modules used in the implementation of the management system for data in a distributed environment. The various modules within the computing device (300) comprise executable program code that may be executed separately. In this example, the various modules may be stored as separate computer program products. In another example, the various modules within the computing device (300) may be combined within a number of computer program products; each computer program product comprising a number of the modules. Accordingly, the number of modules may be implemented as entirely hardware, entirely software, or combining software and hardware implementation.

Aspects of the present system and method are described herein with reference to flowchart illustrations and/or block diagrams of methods, apparatus (systems) and computer program products, according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (301) of the computing device (300) or other programmable data processing apparatus, implements the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The measuring module (310) measures, using a number of sensors (FIG. 1, 135) associated with a number of computing devices (FIG. 1, 120), a number of environmental parameters related to the number of computing devices (FIG. 1, 120). The number of sensors (FIG. 1, 135) may be associated with a computer rack (FIG. 1, 130) or a computing device (FIG. 1, 120). The number of sensors (FIG. 1, 135) may operate independent of both the computer rack (FIG. 1, 130) and the computing device (FIG. 1, 120). The sensors (FIG. 1, 135) provide quantitative data regarding environmental parameters.

The receiving module (311) receives a set of supplemental environmental parameters, the supplemental environmental parameters representing environmental parameters to supplement the sensed environmental parameters. The supplemental environmental parameters provide data to accommodate sensors that may be missing or malfunctioning. The supplemental environmental parameters may provide additional data to compliment the sensed data and determine if environmental factors are being controlled.

The adjusting module (312) adjusts the sensed environmental parameters based on the set of supplemental environmental parameters. The sensed environmental parameters are modified to include data provided by the supplemental environmental parameters. The adjusting module (312) may determine expected environmental parameters and compare them to measured environmental parameters.

The displaying module (313) displays sensed environmental parameters. The displaying module (313) displays each sensed environmental parameter so that the display of the sensed environmental parameters is spatially related to the space to which the parameter pertains.

The presenting module (314) presents a message when the environmental parameters measure outside of a policy range. The presenting module (314) compares a sensed environmental parameter to the policy range. The presenting module (314) may provide a message that a sensed environmental parameter is within the policy range. The presenting module (314) may provide a message that each sensed environmental parameter is outside the policy range.

Figure 4:
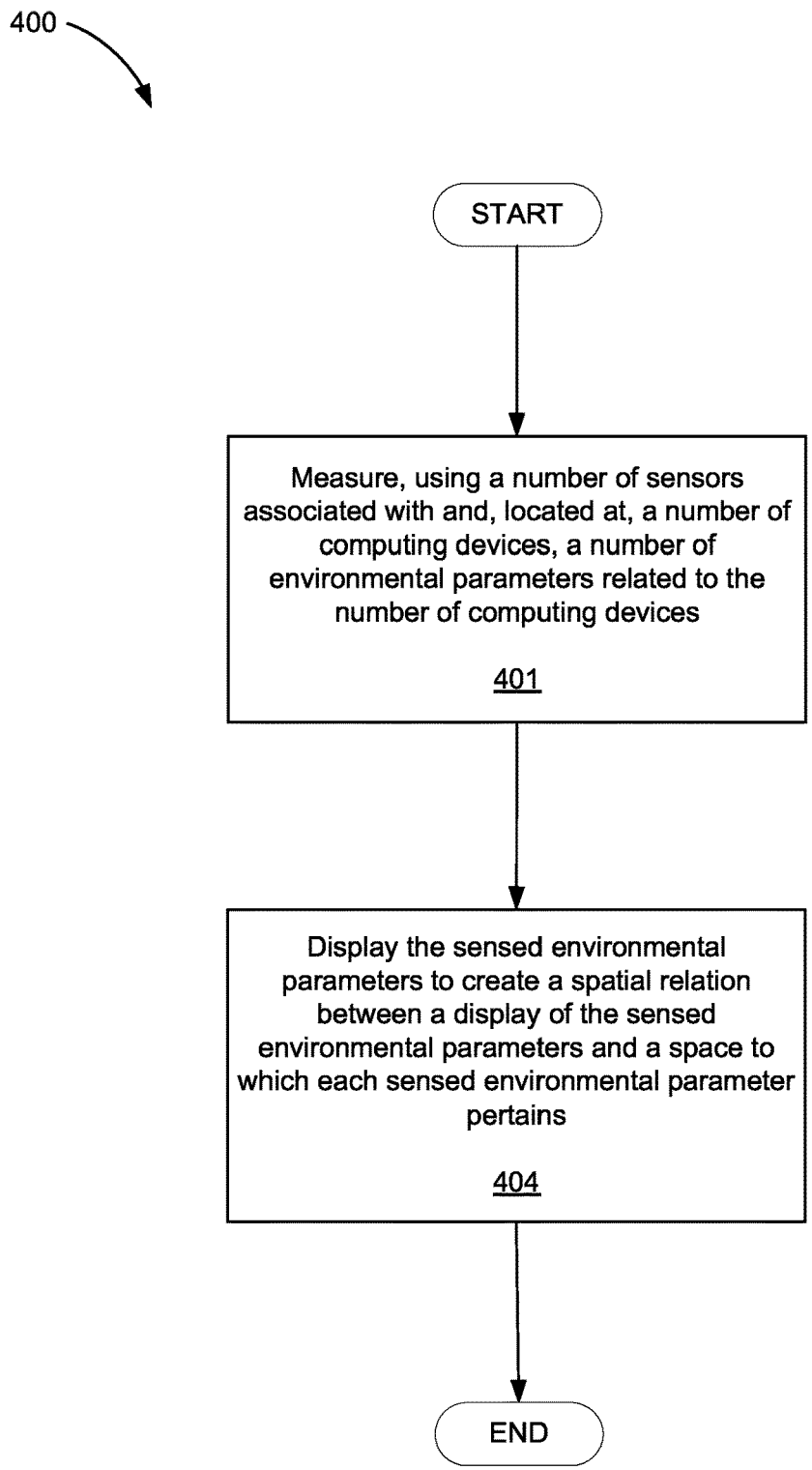
FIG. 4 illustrates a flowchart of a method implemented by a computing equipment monitoring system, according to one example of the principles described herein.

FIG. 4 is a flowchart of a method for monitoring a computing device, according to one example of the principles described herein. The method (400) may be executed by the voice authentication system of FIG. 1. The method (400) may be executed by other systems (i.e. system 200, system 300, system 600). As illustrated, the method (400) includes measuring (401), using a number of sensors (FIG. 1, 135) associated with a number of computing devices (FIG. 1, 120), a number of environmental parameters related to the number of computing devices (FIG. 1, 120). The method (400) includes displaying (404), with a computer, sensed environmental parameters to create a spatial relation between a display of the sensed environmental parameters and a space to which each sensed environmental parameter pertains.

As mentioned above, the method (400) includes measuring (401), using a number of sensors (FIG. 1, 135) associated with and, located at, a number of computing devices (FIG. 1, 120), a number of environmental parameters related to the number of computing devices (FIG. 1, 120). The sensors (FIG. 1, 135) may be embedded in the number of computing devices (FIG. 1, 120), such as a CPU temperature monitor. The sensors (FIG. 1, 135) may be associated with a computer rack (FIG. 1, 130), the computer rack (FIG. 1, 130) organizing the number of computing devices (FIG. 1, 120).

As mentioned above, the method (400) includes with a computer, displaying (401) sensed environmental parameters, based on an actual view (FIG. 2A, 201) of the number of computing devices (FIG. 2A, 220), to create a spatial relation between a display of the sensed environmental parameters and a space to which each sensed environmental parameter pertains. The displaying (404) may display the sensed environmental parameters in an image (FIG. 1, 101).

The displaying (404) may display the sensed environmental parameters in a user's actual view (FIG. 2A, 201) of a space related to the sensed environmental parameters. The displaying (404) may project sensed environmental parameters into a space related to the sensed environmental parameters.

Figure 5:
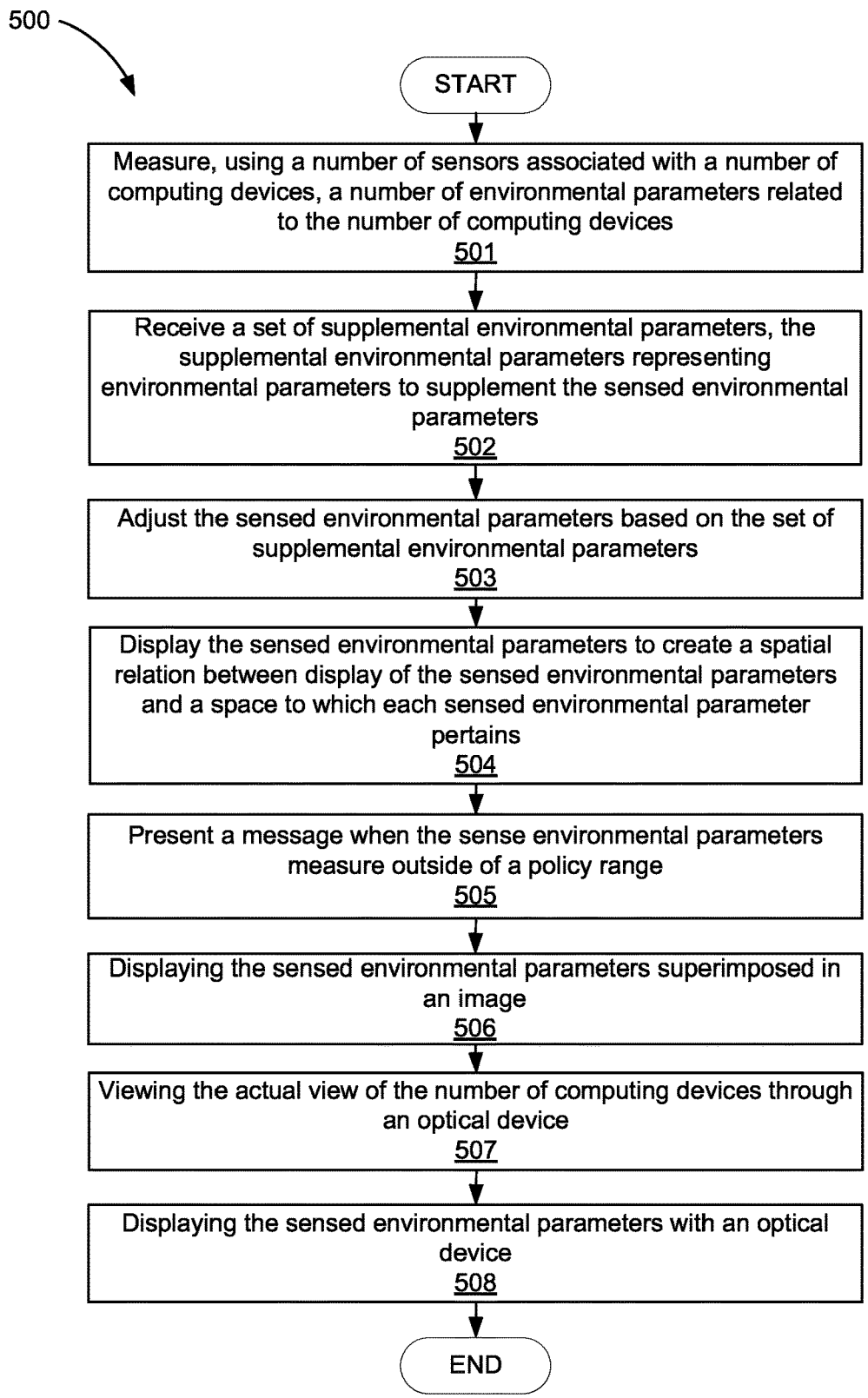
FIG. 5 illustrates a flowchart of a method implemented by a computing equipment monitoring system, according to one example of the principles described herein.

FIG. 5 is a flowchart of a method for monitoring a computing device, according to one example of the principles described herein. The method (500) may be executed by the voice authentication system of FIG. 1. The method (500) may be executed by other systems (i.e. system 200, system 300, system 600). As illustrated, the method (500) includes measuring (501), using a number of sensors (FIG. 1, 135) associated with a number of computing devices (FIG. 1, 120), a number of environmental parameters related to the number of computing devices (FIG. 1, 12). The method (500) includes receiving (502) a set of supplemental environmental parameters, the supplemental environmental parameters representing environmental parameters to supplement the sensed environmental parameters. The method (500) includes adjusting (503) the sensed environmental parameters based on the set of supplemental environmental parameters. The method (500) includes displaying (504), with a computer, sensed environmental parameters, to create a spatial relation between a display of the sensed environmental parameters and a space to which each sensed environmental parameter pertains. The method (500) includes presenting (505) a message when the sensed environmental parameters measure outside of a policy range.

As mentioned above, the method (500) includes measuring (501), using a number of sensors (FIG. 1, 135) associated with and, located at, a number of computing devices (FIG. 1, 120), a number of environmental parameters related to the number of computing devices (FIG. 1, 120).

As mentioned above, the method (500) includes receiving (502) a set of supplemental environmental parameters, the supplemental environmental parameters representing environmental parameters to supplement the sensed environmental parameters. The supplemental environmental parameters allow the system (FIG. 1, 110) to correct inaccuracies or incomplete data from the number of sensors (FIG. 1, 135). The supplemental environmental parameters may allow the system (FIG. 1, 110) to determine an expected environmental parameter to compare with a measured environmental parameter.

As mentioned above, the method (500) includes adjusting (503) the sensed environmental parameters based on the set of supplemental environmental parameters. The adjusting (503) allows for the correction of imperfections in the sensed environmental parameters.

As mentioned above, the method (500) includes displaying (504) sensed environmental parameters, based on an actual view (FIG. 2A, 201) of the number of computing devices (FIG. 2A, 220), to create a spatial relation between a display of the sensed environmental parameters and a space to which each sensed environmental parameter pertains. Each sensed environmental parameter may be displayed in the image (FIG. 1, 101) of the number of computing devices (FIG. 1, 120), or may displayed so that a user can correlate the data displayed with a computing device (FIG. 1, 120).

As mentioned above, the method (500) includes presenting (505) a message when the environmental parameters measure outside of a policy range. The presenting (505) informs a user that the environmental parameters observed raise cause for concern. The user may then take corrective action. The presenting (505) may inform the user when a measured environmental parameter deviates from a corresponding expected environmental parameter.

As mentioned above, the method (500) includes displaying (506), with an image (FIG. 1, 101) of the actual view of the number of computing devices, the sensed environmental parameters superimposed on the image (FIG. 1, 101) in accordance with each sensed environmental parameter being displayed at a space on the image to which each parameter pertains. The image (FIG. 1, 101) may be a video image of a number of computing devices (FIG. 1, 120). The image (FIG. 1, 101) may be a real-time image of the number of computing devices (FIG. 1, 120).

As mentioned above, the method (500) includes viewing (507), through an optical device worn by a user, the rack environment monitoring system. The actual view of the number of computing devices is viewed through the optical device worn by a user. The viewing (507) may occur through a detection of location of the device and a direction a user is facing. The viewing may user a camera to detect items in the user's field of vision.

As mentioned above, the method (500) includes displaying (507) sensed environmental parameters with the optical device worn by the user. The environmental parameters being displayed on the optical device at locations in the actual view seen through the optical device corresponding to each of those environmental parameters. The optical device may project data onto the device in a manner that appears to the user to be superimposed on the actual view. The optical device may display the sensed environmental parameters on the device. As viewed by the user, the sensed environmental parameters appear to have a spatial relation with the space to which each pertains.

Figure 6:
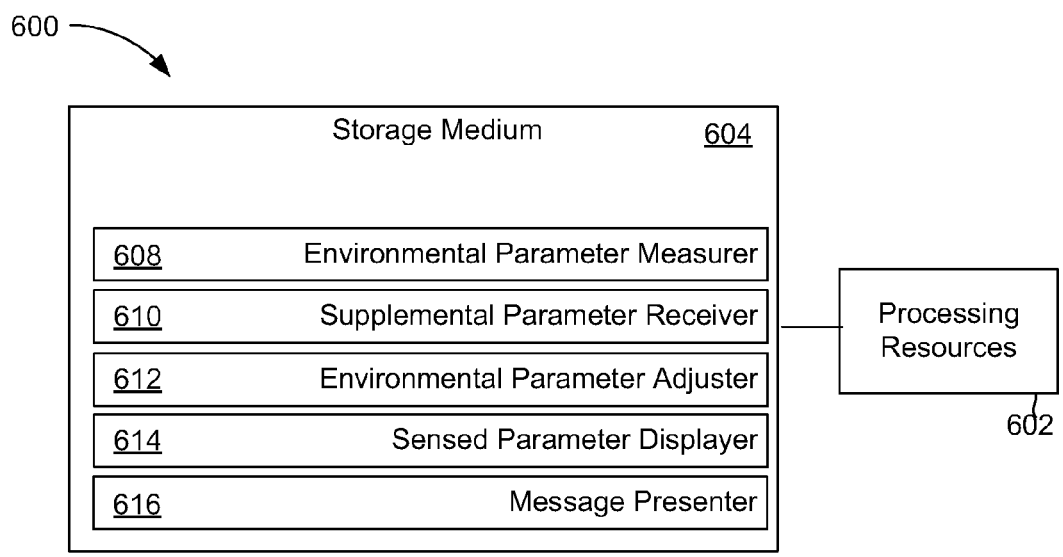
FIG. 6 illustrates a diagram of a system for monitoring computing equipment, according to one example of the principles described herein.

FIG. 6 is a diagram of a rack environment monitoring system (600) according to one example of the principles described herein. The rack environment monitoring system (600) includes processing resources (602) that are in communication with memory resources (604). The processing resources (602) include at least one processor and other resources used to process programmed instructions. The memory resources (604) generally represent any memory capable of storing data, such as programmed instructions or data structures to be used by the rack environment monitoring system (600). The programmed instructions shown stored in the memory resource (604) include an environmental parameter measurer (608), a supplemental parameter receiver (610), an environmental parameter adjuster (612), a sensed parameter displayer (614), and a message presenter (616).

The environmental parameter measurer (608) represents programmed instructions that, when executed, cause the processing resource (602) to measure, using a number of sensors (FIG. 1, 135) associated with a number of computing devices (FIG. 1, 120), a number of environmental parameters related to the number of computing devices (FIG. 1, 120). The supplemental parameter receiver (610) represents programmed instructions that, when executed, cause the processing resource (602) to receive a set of supplemental environmental parameters, the supplemental environmental parameters representing environmental parameters to supplement the sensed environmental parameters.

The environmental parameter adjuster (612) represents programmed instructions that, when executed, cause the processing resource (602) to adjust the sensed environmental parameters based on the set of supplemental environmental parameters. The sensed parameter displayer (614) represents programmed instructions that, when executed, cause the processing resource (602) to display sensed environmental parameters to create a spatial relation between a display of the sensed environmental parameters and a space to which each sensed environmental parameter pertains.

The message presenter (616) represents programmed instructions that, when executed, cause the processing resource (602) to present a message when the environmental parameters measure outside of a policy range.

The rack environment monitoring system (600) of FIG. 6 may be part of a general purpose computer. The rack environment monitoring system (600) of FIG. 6 may be part of a mobile device, such as a mobile telephone. However, in alternative examples, the rack environment monitoring system (600) is part of an application specific circuit.

The flowchart and block diagrams in the Figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

What is claimed is:

1. A computer implemented method for monitoring computer equipment, the method comprising:
    measuring, using a number of sensors located at and associated with a number of computing devices, a number of environmental parameters related to the number of computing devices;
    receiving an image from a camera of a wearable device, comprising glasses, worn by a user, the image representing an actual view of the number of computing devices as seen by the user; and
    with a computer, displaying sensed environmental parameters, based on the actual view of the number of computing devices, to create a spatial relation between a display of the sensed environmental parameters and a space to which each sensed environmental parameter pertains, such that the user sees an indication of a sensed environmental parameter superimposed on the actual view of the number of computing devices viewed through the glasses, the displayed indication of the sensed environmental parameter appearing in spatial relation to a corresponding location of the sensed environmental parameter in the actual view.

2. The method of claim 1, further comprising:
    receiving a set of supplemental environmental parameters, the supplemental environmental parameters representing environmental parameters to compensate for inaccurate or incomplete environmental parameters reported by the number of sensors; and
    adjusting the displayed indication of sensed environmental parameters based on the set of supplemental environmental parameters.

3. The method of claim 1, further comprising, with the image of the actual view of the number of computing devices, displaying the sensed environmental parameters superimposed on the image in accordance with each sensed environmental parameter being displayed at a space on the image to which each parameter pertains.

4. The method of claim 1, wherein measuring, using the number of sensors associated with the number of computing devices, the number of environmental parameters related to the number of computing devices, comprises measuring temperature.

5. The method of claim 1, wherein measuring, using the number of sensors associated with the number of computing devices, the number of environmental parameters related to the number of computing devices comprises, measuring electricity usage.

6. The method of claim 1, wherein measuring, using the number of sensors associated with the number of computing devices, the number of environmental parameters related to the number of computing devices comprises, measuring usage of the number of computing devices.

7. The method of claim 1, further comprising presenting a message when a sensed environmental parameter measures outside of a policy range.

8. The method of claim 1, further comprising viewing the actual view of the number of computing devices through an optical device worn by a user and displaying the sensed environmental parameters with the optical device worn by the user, the environmental parameters being displayed on the optical device at locations in the actual view seen through the optical device corresponding to each of those parameters.

9. A system for monitoring computer equipment, the system comprising:
    a processor;
    memory, communicatively connected to the processor;
    a computer display, communicatively connected to the processor; and
    a rack environment monitoring system to use the processor to execute modules, the rack environment monitoring system comprising:
        a measuring module, to measure, using a number of sensors located at and associated with, a number of computing devices, a number of environmental parameters related to the number of computing devices;
        a receiving module, to receive a set of supplemental environmental parameters, the supplemental environmental parameters representing environmental parameters to supplement the sensed environmental parameters;
        an adjusting module, to adjust the sensed environmental parameters based on the set of supplemental environmental parameters;
        a displaying module, to display sensed environmental parameters, based on an actual view of the number of computing devices, to create a spatial relation between a display of the sensed environmental parameters and a space to which each sensed environmental parameter pertains;
        a superimposing module, to display the sensed environmental parameters by superimposing the sensed environmental parameters on image at a space on the image to which each parameter pertains; and,
        a presenting module, to present a message when a sensed environmental parameter measures outside a policy range.

10. The system of claim 9, further comprising an optical device worn by a user, and the rack environment monitoring system viewing the actual view of the number of computing devices through an optical device worn by a user and displaying sensed environmental parameters with the optical device worn by the user, the environmental parameters being displayed on the optical device at locations in the actual view seen through the optical device corresponding to each of those environmental parameters.

11. The system of claim 9, wherein the measuring module measures temperature.

12. The system of claim 9, wherein the measuring module measures electricity usage.

13. The system of claim 9, wherein the measuring module measures usage of the number of computing devices.

14. A computer program product for monitoring computing equipment, the computer program product comprising:
- a non-transitory tangible computer readable storage medium, said tangible computer readable storage medium comprising computer readable program code embodied therewith, said computer readable program code comprising program instructions that, when executed, cause a processor to:
- measure, using a number of sensors located at and, associated with, a number of computing devices, a number of environmental parameters related to the number of computing devices;
- receive a set of supplemental environmental parameters, the supplemental environmental parameters representing environmental parameters to supplement the sensed environmental parameters;
- adjust the sensed environmental parameters based on the set of supplemental environmental parameters; and
- display sensed environmental parameters to create a spatial relation between a display, based on an actual view of the number of computing devices, of the sensed environmental parameters and a space to which each sensed environmental parameter pertains.

15. The product of claim 14, further comprising, with an image of the actual view of the number of computing devices, displaying the sensed environmental parameters superimposed superimposed on the image in accordance with each sensed environmental parameter being displayed at a space on the image to which each parameter pertains.

16. The product of claim 15, further comprising computer readable program code comprising program instructions that, when executed, cause the processor to present a message when the sensed environmental parameters measure outside a policy range.

17. The product of claim 14, wherein the computer readable program code comprising program instructions that, when executed, cause the processor to measure, using the number of sensors associated with the number of computing devices, a number of environmental parameters related to the number of computing devices comprises measuring temperature.

18. The product of claim 14, wherein the computer readable program code comprising program instructions that, when executed, cause the processor to measure, using the number of sensors associated with the number of computing devices, the number of environmental parameters related to a number of computing devices comprises measuring electricity usage.

19. The product of claim 14, wherein the computer readable program code comprising program instructions that, when executed, cause the processor to measure, using the number of sensors associated with the number of computing devices, the number of environmental parameters related to the number of computing devices comprises measuring usage of the number of computing devices.

20. The product of claim 14, further comprising computer readable program code comprising program instructions that, when executed, cause a processor to present a message when a sensed environmental parameter measure is outside of a policy range.

21. The method of claim 1, wherein the indication of a sensed environmental parameter is projected on a lens of the glasses.

* * * * *